United States Patent [19]

Sato

[11] Patent Number: 4,742,886
[45] Date of Patent: May 10, 1988

[54] SEAT BELT APPARATUS

[75] Inventor: Yoshimi Sato, Yokohama, Japan

[73] Assignee: Nissan Motor Co., Ltd., Yokohama, Japan

[21] Appl. No.: 15,700

[22] Filed: Feb. 17, 1987

[30] Foreign Application Priority Data

Feb. 17, 1986 [JP] Japan ................................ 61-30631
Feb. 27, 1986 [JP] Japan ................................ 61-40168

[51] Int. Cl.⁴ .............................................. B60R 21/10
[52] U.S. Cl. ...................................... 180/268; 280/801
[58] Field of Search ........................ 180/268; 280/801

[56] References Cited

U.S. PATENT DOCUMENTS 4,553,625 11/1985 Tsuge et al. ....................... 180/268

FOREIGN PATENT DOCUMENTS 53-153631 12/1978 Japan .
609286 2/1979 Switzerland ...................... 180/268

Primary Examiner—Kenneth R. Rice
Attorney, Agent, or Firm—Foley & Lardner, Schwartz, Jeffery, Schwaab, Mack, Blumenthal & Evans

[57] ABSTRACT

A seat belt apparatus comprises an engaging device attached to a seat belt, a buckle device engagable with the engaging device, and a device for releasing the engagement between the engaging device and the buckle device in association with the opening operation of a door.

4 Claims, 7 Drawing Sheets

SEAT BELT APPARATUS

BACKGROUND OF THE INVENTION

The present invention relates to an improvement for a seat belt apparatus for motor vehicles and the like.

DESCRIPTION OF THE PRIOR ART

In the prior-art seatbelt apparatus for motor vehicles or the like, a type which has, for example, an emergency locking reel (ELR) for automatically taking up a webbing upon release of a tongue from a buckle, is in wide use. See, for instance, FIG. 1 and FIG. 2 of Japanese Laid-Open Utility Model No. 53-153631.

However, in such an existing seatbelt apparatus, when a passenger gets out of the vehicle, the passenger has to manually release the engagement of the tongue with the buckle, and this is troublesome.

Particularly, with a diagonal type seatbelt apparatus in which a shoulder belt automatically constrains and releases the passenger, it is felt very troublesome if the release operation of the belt is to be done manually, in spite of the convenience of automatic wearing of the shoulder belt.

SUMMARY OF THE INVENTION

An object of the present invention, with the problems of the prior-art apparatus in mind, is to provide a seatbelt apparatus which can release a tongue automatically from a buckle in association with the opening operation of a door by a passenger alighting from the vehicle.

With the above object in view, the present invention comprises a tongue which is attached to the tip of a webbing, a buckle which can freely engage with or release the tongue, and interlocking means which releases the engagement of the tongue with the buckle in association with the opening operation of a door.

In another embodiment, the present invention includes a tongue which is attached to the tip of a webbing, a buckle which can freely engage with or release the tongue, interlocking means which releases the engagement of the tongue with the buckle in association with the door opening operation, sensing means which senses the acceleration of the vehicle, and release preventing means which prevents the releasing by the interlocking means, based on the acceleration sensing performed by the sensing means.

DETAILED DESCRIPTION OF THE PREFERRED EMBODIMENTS

The embodiments of a seatbelt apparatus of the present invention will be described in detail.

Figure 1:
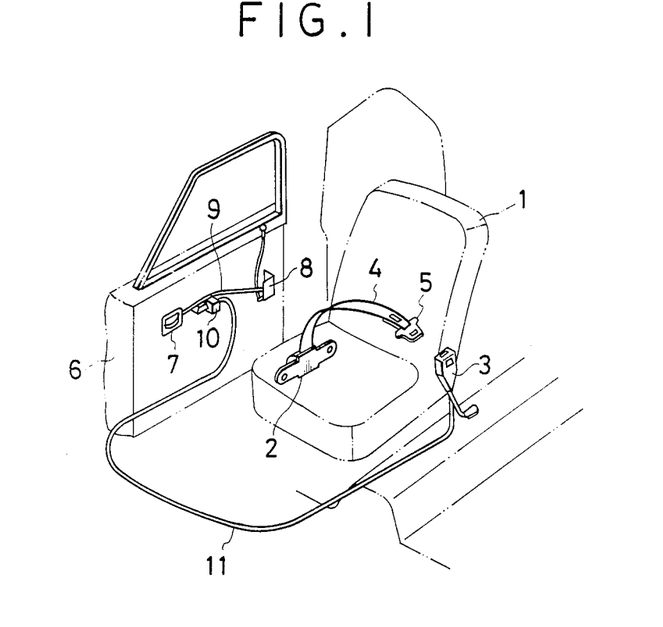
FIG. 1 is a perspective view of an embodiment of a seatbelt apparatus of the invention.

First, on both sides of a seat 1 of a vehicle, there are arranged an emergency locking reel, (ELR), 2 and a buckle 3, as shown in FIG. 1. From the ELR 2 there is payed out a webbing 4, and a tongue 5 is mounted on the webbing 4, and there is provided a rod interlocking and linking device 10 as interlocking means for a linking rod 9 which links an inside handle 7 with a door locking device 8. From the rod interlocking and linking device 10, there is extended a flexible wire 11 which is interlocked with release means of the buckle 3 that will be described later.

Figure 2:
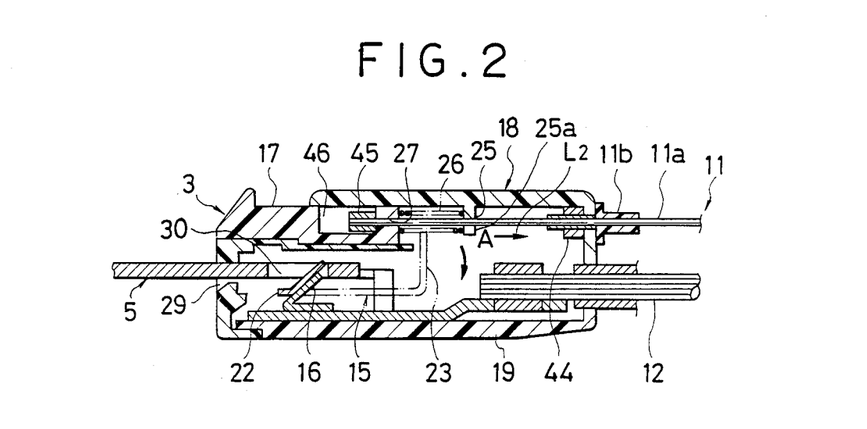
FIG. 2 is a cross-sectional view of a buckle portion of the embodiment.
Figure 3:
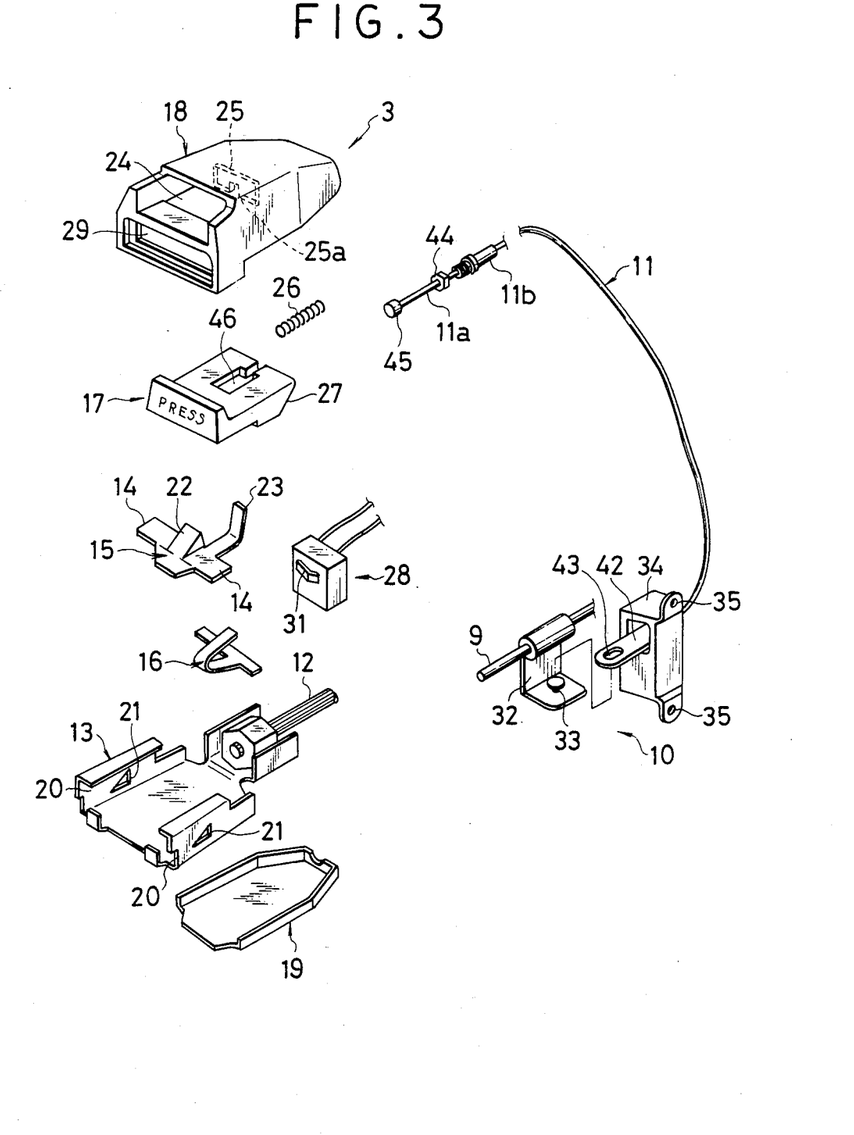
FIG. 3 is a disassembled perspective view of the buckle portion and a rod interlocking and linking device of the embodiment.
Figure 4:
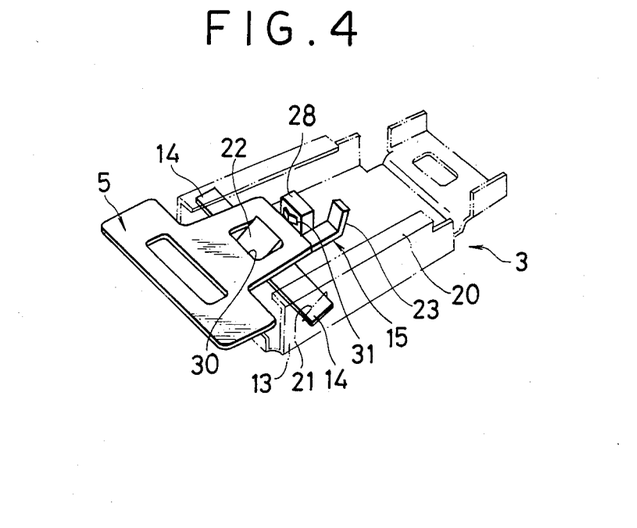
FIG. 4 is a perspective view which explains an engagement condition between the buckle and a tongue in the embodiment.

As shown in FIG. 2 to FIG. 4, the buckle 3 is composed of a base plate 13 which is joined to a fixed rod 12, a latch 15 whose right and left arms 14 are supported turnably by the base plate 13, a push-up spring 16 which pushes up the latch 15, a release button 17 which serves as releasing means, and upper and lower covers 18 and 19 for housing the respective elements described in the above.

The right and left arms 14 of the latch 15 are respectively rotatably engaged with triangular engaging openings 21 that are formed in left and right rising portions 20 of the base plate 13. Further, the push-up spring 16 presses from below a latch portion 22 which slopes up toward the rear from the central part of the latch 15, to support the latch 15 in the engaging state. In an end portion of the latch 15 there is formed a rising piece 23 to be engaged with a release button 17.

The release button 17 is inserted slidably into a guiding hole 24 in the upper cover 18, and is energized at all times in the direction out of the guiding hole 24 by a compressing spring 26 that is placed between a spring seat plate 25 and the upper cover 18. A sloped portion 27 on the tip of the release button 17 faces the rising piece 23 of the latch 15 in the front-to-back direction. When the release button 17 is pushed in against the force of the compressed spring 26, the sloped section 27 turns the rising piece 23 downward.

Further, on the base plate 13, there is arranged a switch 28 for detecting the engagement of the tongue 5 at a position which faces the latch portion 22 of the latch 15 in the front-to-back direction.

Next, the engagement and release operations of the tongue 5 for the buckle 3 will be described. As shown in FIG. 2 and FIG. 4, when the tongue 5 is pushed into the buckle 3 through a tongue insertion hole 29 in the upper cover 18, the tip of the tongue 5 pushes down the latch portion 22 of the latch 15 against the force of the push-up spring 16. Then, the push-up spring 16 pushes up the latch portion 22, and lets the latch portion 22 engage with an engagement aperture 30 of the tongue 5. Here, in this engagement, the tip of the tongue 5 activates the contact 31 of the engagement detection switch 28 to turn off a lamp for indicating an unlocked seatbelt condition.

To release the tongue 5 from the buckle 3, the release button 17 is pushed in against the force of the compressing spring 26. By this operation, the sloped portion 27 of the release button 17 pushes down the rising piece 23 of the latch 15, and causes the entire latch 15 to turn in the clockwise direction shown by the arrow A in FIG. 2 with the arms 14 as a center. As a result of this turning, the latch portion 22 is disengaged from the engagement aperture 30, releasing the tongue 5 from the buckle 3.

In a seatbelt apparatus of this kind, the construction and the operation of the rod interlocking and linking device 10 which is designed for disconnecting the tongue 5 from the buckle 3 in association with the opening operation of the inside handle 7 of the door 6, will be described next.

Figure 5:
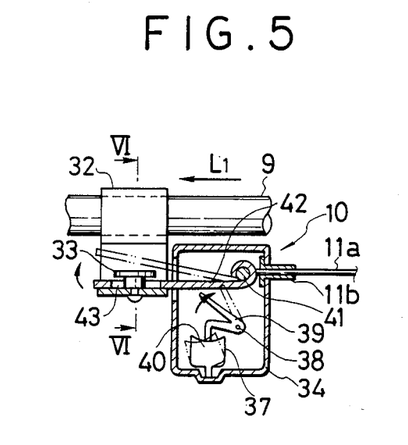
FIG. 5 is a cross-sectional view which shows a portion of the rod interlocking and linking device in the present invention.
Figure 6:
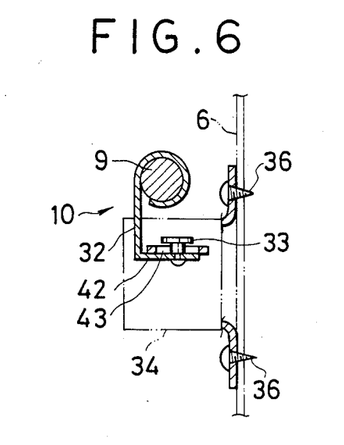
FIG. 6 is a cross sectional view of FIG. 5 taken along VI—VI line.

The rod interlocking and linking device 10 linked as the interlocking means of the inside handle 7 shown in FIG. 1 to the linking rod 9, is shown in detail in FIG. 3, FIG. 5, and FIG. 6. An L-shaped linkage fitting 32 is fixed to the linking rod 9. In the horizontal portion of the linkage fitting 32, there is provided an engagement pin 33.

Onto the inner panel 6a of the door 6, a main body 34 is fixed with small screws 36 or the like. Inside the body 34, there is provided a pawl 37 whose change in vertical condition is used, to detect the deceleration of the vehicle in collision or transverse acceleration in rollover of the vehicle, with an actuator 39 supported by a pin 38 engaged with a spherical concave portion 40 of the pawl 37. With the actuator 39 there is engaged a separation linkage piece 42 thereabove which is supported by a linking pin 41 as a hinge. The separation linkage piece 42 is projected forward of the linkage fitting 32, and the engagement pin 33 of the linkage fitting 32 is engaged with an engagement aperture 43 in the projected portion of the linkage fitting 32, so as to be free to be engaged or disengaged.

One end of the inner portion 11a of a flexible wire 11 is connected to the linking pin 41 of the separation linkage piece 42. One end of the wire outer portion 11b is fixed to the body 34. The other end of the wire inner portion 11a is linked with the release button 17 of the buckle 3, as shown in FIG. 2 and FIG. 3. The other end of the wire outer portion 11b of the flexible wire 11 is fixed with a fixing nut 44 that is provided in the rear of the upper cover 18, and an engaging member 45 which is fixed onto the tip of the wire inner portion 11a is engaged with the release button 17. On the release button side, there is formed an engaging opening 46 with a taper tapering toward the cut-open section. By the insertion of the engaging member 45 into the engaging opening 46, the tip of the flexible wire 11 is connected to the release button 17. The wire inner portion 11a penetrates the spring seat plate 25 through a notch 25a.

The separating operation of the tongue 5 from the buckle 3 in the rod interlocking and linking device 10 will be described next.

In the normal condition, the pawl 37 is standing in its vertical state as shown by the solid line in FIG. 5, with the actuator 39 engaged with the concave surface of the concave portion. As a result, the separation linkage piece 42 is in horizontal state and the engagement aperture 43 is engaged with the engagement pin 33 of the linkage fitting 32.

Therefore, when the door 6 is opened or closed by the operation of the inside handle 7 by the passenger, the linking rod 9 is moved in the direction shown by the arrow L1 in FIG. 5. Accompanying this motion of the linking rod 9, the linkage fitting 32 is moved also in the L1 direction, and pulls the flexible wire 11 in the L1 direction via the engagement pin 33 and the separation linkage piece 42.

Accordingly, the flexible wire 11 in FIG. 2 is pulled in the direction of arrow L2, and the engaging member 45 pulls the release button 17 to the inside of the upper cover 18. This motion of the release button 17 is the same as in the case of the manual release operation of the buckle 3. Namely, the sloped portion 27 at the tip of the release button 17 turns the latch 15 in the clockwise direction as shown by the arrow A, disengaging the latch portion 22 from the engagement aperture 30, separating the tongue 5.

In this manner, it is possible to separate the tongue 5 automatically from the buckle 3 in association with the opening operation by the inside handle 7. Moreover, even if the door is opened for some reason in a collision or rollover, the inside handle 7 will not be interlocked with the action of the locking device 8, so that the above-mentioned release of the buckle 3 does not take place and the safety of the passenger can be secured.

On the other hand, if the inside handle 7 is rotated by the passenger during collision or rollover, it is desirable for the seatbelt apparatus to perform its role in keeping the passenger constrained to the seat 1. In such a case, the rod interlocking and linking device 10 operates so as not to be interlocked with the inside handle 7. In other words, when a large deceleration or transverse acceleration due to collision or rollover is applied to the vehicle, the pawl 37 deviates from the vertical situation as shown by the imaginary view of FIG. 5 and is turned to push up the actuator 39. By this turning, the actuator 39 causes the separation linkage piece 42 to be turned upward to disengage the engagement aperture 43 from the engagement pin 33. Accordingly, the separation linkage piece 42 is separated from the linkage fitting 32 so that even if the linking rod 9 and the linkage fitting 32 are moved by the operation of the inside handle 7, the separation linkage piece 42 will not be pulled, without pulling the flexible wire 11 and separation of the tongue 5 from the buckle 3, securing the safety of the passenger.

It should be mentioned that one end of the flexible wire 11 may be linked directly to the linkage fitting 32. In addition, the seatbelt apparatus of the present invention may be applied to ships, aircrafts, and others.

In the present invention, the tongue is arranged to be separated from the buckle interlocked with the opening operation of the inside handle of the door, eliminating the passenger of the burden of carrying out the releasing operation of the buckle each time when he alights from the vehicle, and thereby making it possible to automatically separate the tongue from the buckle interlocked with the opening operation of the door.

Furthermore, even when the door is opened unexpectedly, the inside handle is not operably interlocked with the locking device so that the release operation will not take place unless the inside handle is operated, securing the safety of the passenger.

Next, another embodiment of the seatbelt apparatus in accordance with the present invention will be described.

Figure 7:
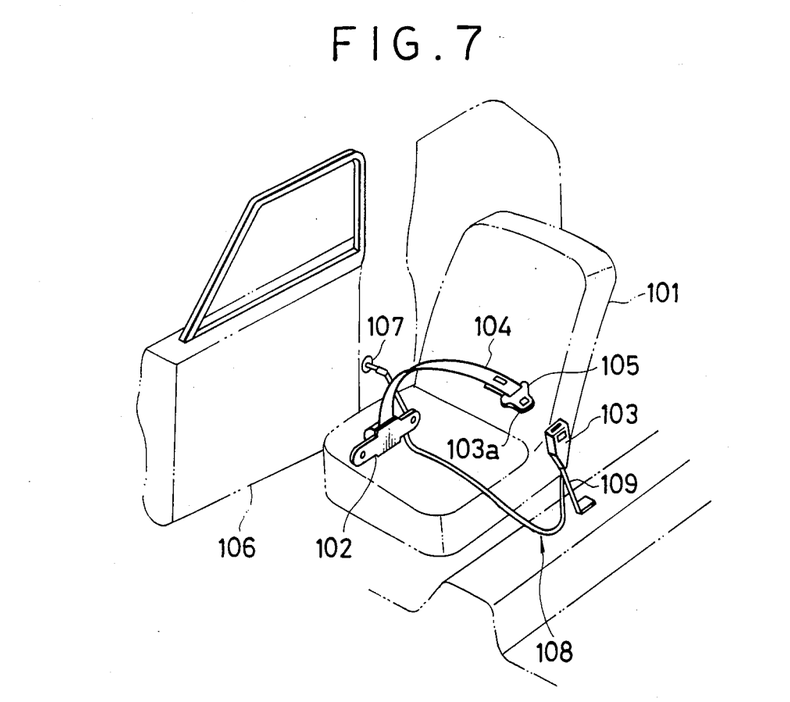
FIG. 7 is a perspective view which shows another embodiment of the seatbelt apparatus of the present invention.

As in the first embodiment, an emergency locking reel, (ELR), 102 and a buckle 103 are provided on both sides of the vehicle seat 101 as shown in FIG. 7. A webbing 104 is payed out from the ELR 102 to whose tip is attached a tongue 105. Further, an opening and closing interlocking device 107 for a door 106 is provided as interlocking means, at a location which interlocks with the door opening operation. A flexible wire 108 extends from the door opening and closing interlocking device 107 and is linked to a release means for the buckle 103 which will be described later.

Figure 8:
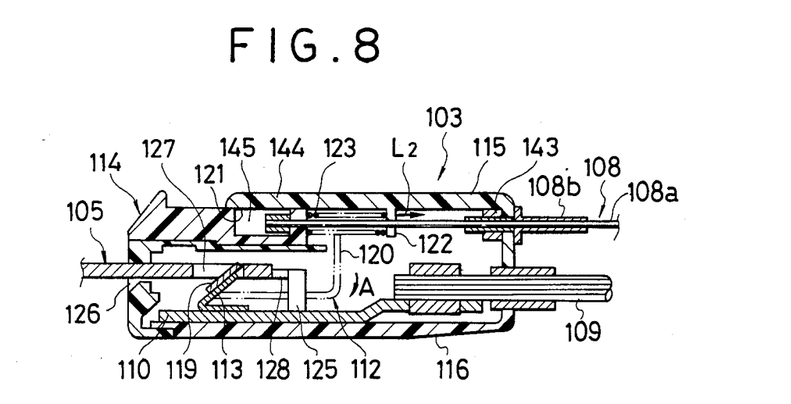
FIG. 8 is a cross-sectional view of the buckle portion of FIG. 7.
Figure 9:
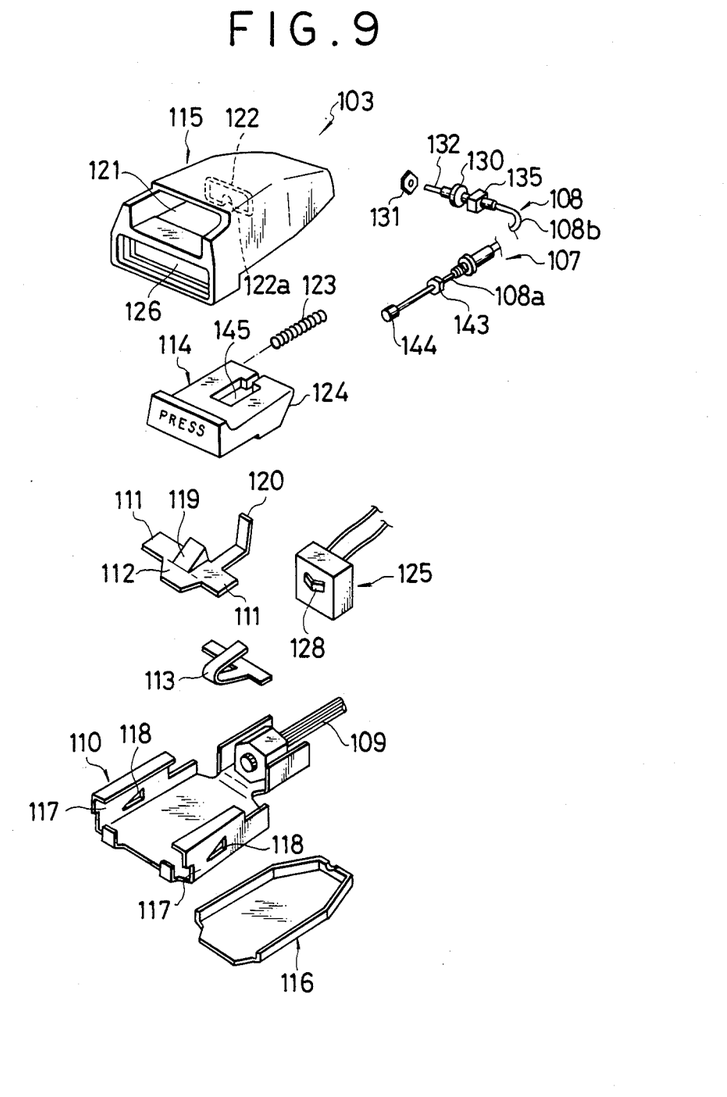
FIG. 9 is a disassembled perspective view of the buckle portion and the interlocking device of FIG. 7.
Figure 10:
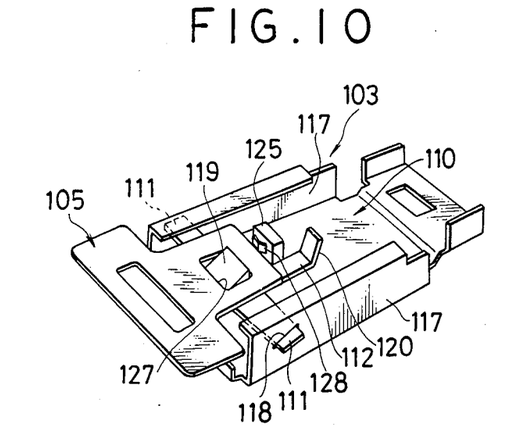
FIG. 10 is a perspective view which explains the engagement situation between the buckle and the tongue of FIG. 7.

As shown in FIG. 8 to FIG. 10, the buckle 103 is constructed by a base plate 110 which is linked to a fixed rod 109, a latch 112 whose left and right arms 111 are supported turnably on the base plate 110 as will be described later, a push-up spring 113 which pushes up the latch 112, a release button 114 as release means, and upper and lower covers 115 and 116 that house the respective elements in the above.

The left and right arms 111 of the latch 112 are rotatably engaged turnably with triangular engaging openings 118 formed in left and right rising portions 117 of the base plate 110. Further, the push-up spring 113 contacts and pushes up from below a latch portion 119 which is sloped up at the central part of the latch 112, to hold the latch 112 in the engaging condition. In the rear end of the latch 112, there is formed a rising piece 120 engaged with the release button 114.

The release button 114 is inserted slidably in a guiding hole 121 of the upper cover 115, and is energized at all times in the popping direction from the guiding hole 121 by a compressing spring 123 which is inserted between a spring seat plate 122 and the upper cover 115. A sloped portion 124 at the tip of the release button 114 faces the rising piece 120 of the latch 112 in the front-to-back direction. When the release button 114 is pushed in against the force of the compressing spring 123, the sloped portion 124 causes the rising piece 120 to be turned downward.

Further, on the base plate 110, there is arranged an engagement detection switch 125 for the tongue 105, at the position facing the latch portion 119 of the latch 112 in the front-to-back direction.

Next, the engagement and release operations of the tongue 105 for the buckle 103 will be described. As shown in detail in FIG. 8 and FIG. 10, when the tongue 105 is inserted into the buckle 103 through a tongue insertion hole 126, the tip of the tongue 105 presses down the latch portion 119 of the latch 112 against the force of the push-up spring 113. Then, the push-up spring 113 pushes up the latch portion 119 to engage the latch portion 119 with an engagement aperture 127. In this engagement, the tip of the tongue 105 activates the contact 128 of the engagement detection switch 125 to put out a lamp which indicates an unlocked seatbelt condition.

In releasing the tongue 105 from the buckle 103, the release button 114 is pushed in against the force of the compressing spring 123. By this operation, the sloped portion 124 of the release button 114 presses down the rising piece 120 of the latch 112, and causes the entire latch 112 to turn in the clockwise direction as shown by the arrow A in FIG. 8 with the arms 111 as a center. As a result of the turning, the latch portion 119 is disengaged from the engagement aperture 127 and the tongue 105 is released from the buckle 103 via the winding force of the webbing 104 by ELR 102.

In such a seatbelt apparatus, the construction and operation of the door opening and closing interlocking device 107 which operates the release button 114 as release means in association with the opening and closing of the door 106, will be described next.

As shown in FIG. 9, FIG. 11A, FIG. 12A, and FIG. 12B, a main body portion 130 of the door opening and closing interlocking device 107 is attached with fixing nuts 131 to an appropriate portion of an outer panel 129 of the vehicle body which forms the frontage of the door 106, in order to establish the interlocking with the door 106. In the body portion 130, there is provided a slide bar 132 which projects in the front slides freely toward the direction of the door 106, and is energized by the compressing spring 133 so as to have its tip projected toward the door 106 in a free state. At the rear end section of the slide bar 132, there is connected one end of the inner portion 108a of the flexible wire 108 and the operation of the flexible wire 108 is carried out by the sliding of the slide bar 132 in the projected direction. One end of the outer portion 108b of the flexible wire 108 is inserted and fixed to the body portion 130.

In the middle section of the slide bar 132, there is formed a notched stepped portion 134.

In the middle section of the body section 130, there is formed a forbidding means housing section 135 where a pawl 136 is housed and adapted to maintain its vertical condition. An actuator 138 that engages with a spherical concave section 137 of the pawl 136 as sensing means, and a latch piece 140 that energizes the actuator are respectively supported by pins 139 and 141. The latch piece 140 is positioned above a notched stepped section 134 of the slide bar 132, and is energized to engage with the notched stepped section 134 by a pressing spring 142. In the normal condition, the latch piece 140 is disengaged from the notched stepped section 134 by the engagement of the actuator 138 as shown in FIG. 12A. A release preventing means consists of the actuator 138 and the latch piece 140. Further, a projected portion 132a is formed in the notched stepped section 134, and a sloped surface 135a is formed in the housing section 135 as shown in FIG. 11B. By this construction, the upward motion of the latch piece 140 is regulated at positions as shown by the solid line and the broken line in FIG. 11A, so as to enhance the safety of the apparatus.

The other end of the outer portion 108b of the flexible wire 108 is linked to the upper cover 115 of the buckle 103 with a fixing nut 143 as shown in FIG. 8 and FIG. 9. In addition, an engaging member 144 that is provided at the tip of the wire inner portion 108a is engaged with the release button 114. Here, on the release button side, there is formed an engaging opening 145 that tapers off toward the opening in the rear, and the flexible wire 108 is connected to the release button 114 by engaging the engaging member 114 with the engaging opening 145. Further, the wire inner portion 108a penetrates through a notch 122a in the spring seat plate 122.

Next, the operation of the door opening and closing interlocking device 107 will be described.

Figure 11A:
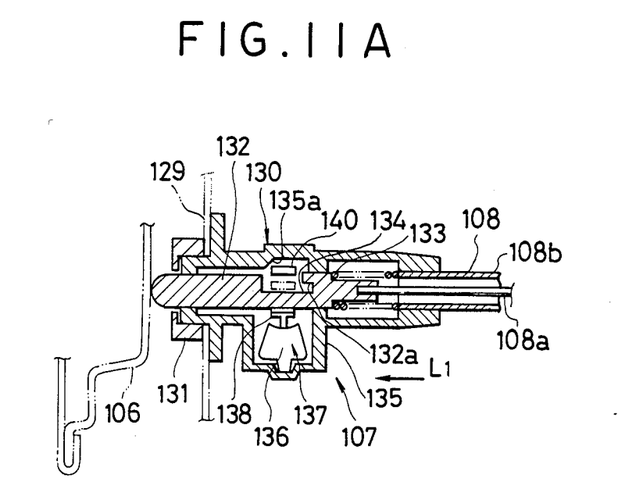
FIG. 11A is a cross sectional view of the device interlocked with the opening and closing of a door in FIG. 7.
Figure 11B:
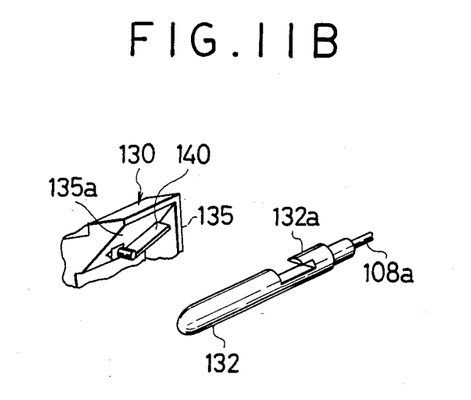
FIG. 11B is a disassembled perspective view which shows an important part of FIG. 7.
Figure 12A:
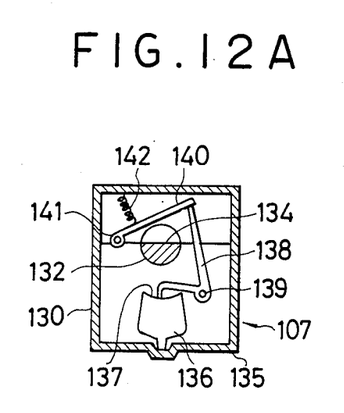
FIG. 12A and FIG. 12B are a diagram for explaining the operation of the door opening and closing interlocking device.

In the normal condition, the pawl 136 stands in vertical condition as shown by the solid line in FIG. 11A and also in FIG. 12A, with its depression in the concave portion 137 engaged with the actuator 138. As a result of the vertical orientation of pawl 136, the latch piece 140 is engaged with the actuator 138, being disengaged from the notched stepped section 134 in the slide bar 132.

When a passenger opens the door 106, the slide bar 132 which has been pushed into the body portion 130 by the door 106, pops out under the force of a spring 133, pulling the wire inner portion 108a of the flexible wire 108 in the direction of the arrow L1. As a result, the wire inner portion 108a is pulled in the direction of the arrow L2 in FIG. 8, and pulls the release button 114 in the direction of release.

This action of the release button 114 is the same as that of the manual release operation of the buckle 103. The sloped section 124 at the tip of the release button 114 turns the latch 112 in the direction of the arrow A, disengages the latch portion 119 from the engagement aperture 127 of the tongue 105, and releases the tongue 105.

In this way, the tongue 105 can be released automatically from the buckle 103 in association with the opening operation of the door 106.

On the other hand, even when the door 106 is opened for some reason, such as by the action of a large deceleration in the forward direction of the vehicle body or a large transverse acceleration in the transverse direction of the vehicle body due to collision or rollover, it is desirable to constrain the passenger to the seat 101. For this reason, when the door 106 is opened suddenly in this way, operation of the interlocking device 107 of the door 106 must be prevented.

Figure 12B:
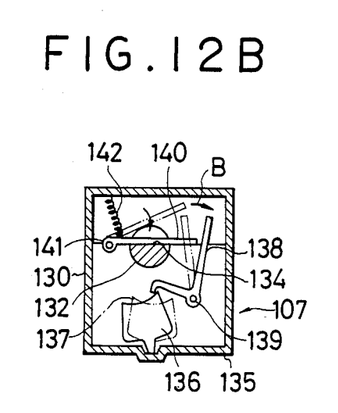

When a large deceleration or a transverse acceleration is applied to the vehicle, the pawl 136 falls down to turn the actuator 138 in the direction of the arrrow B, as shown in FIG. 12B. Because of this, the latch piece 140 engaged with the actuator 138 is disengaged from the actuator 138, turned downward by the force of the pressing spring 142, and is engaged with the notched stepped section 134 of the slide bar 132. As a result, the sliding of the slide bar 132 is obstructed by the latch piece 140. Accordingly, the slide bar 132 cannot pop out of the body portion 130 even if the door is opened, the remote operation of the buckle 103 that is interlocked with the door opening is forbidden, and the safety of the passenger can be secured. Further, by providing for the pressing spring 142 an action of lifting the latch piece 140 with the pin 141 as the center after elape of a predetermined time, the actuator 138 can be made to engage with the concave portion 137 of the pawl 136.

It is to be noted that the seatbelt apparatus in the above can also be applied to ships, aircrafts, and others.

According to the present invention, the engagement of the tongue from the buckle can be released automatically in association with the opening operation of the door, and is free from the necessity of releasing the tongue from the buckle every time the passenger alights from the vehicle, thereby eliminating the trouble of separating the tongue from the buckle.

Moreover, when a large deceleration, lateral acceleration or the like is applied to the vehicle, the interlocking between the door opening operation and the tongue egagement releasing operation is prevented, so that the release operation of the buckle does not take place even when the door is opened for some reason during driving, the safety of the passenger is assured.

What is claimed is:

1. A seat belt apparatus for a transportation device, the transportation device having a door with a handle, a locking device and a linking rod operatively linking the handle with the locking device, comprising:
a tongue secureable on one end of a seat belt;
buckle means engageable with the tongue;
means for releasing the tongue from engagement with the buckle means in response to opening of the door, the releasing means comprising a sliding member engageable at one end with the linking rod and at another end with the buckle means, the sliding member being adapted to slide in association with movement of the linking rod during opening of the door, whereby the sliding member operates the buckle means to release the tongue; and
means for preventing the releasing means from releasing the tongue from engagement with the buckle means when the transportation device accelerates or decelerates, comprising:
a pawl adapted to pivot, in response to acceleration or deceleration of the transportation device, about an axis which is transverse to the direction of movement of the transportation device,
an actuator for interconnecting the pawl and the sliding member, the actuator having one end biased in contact with the pawl and being adapted to move the sliding member out of engagement with the linking rod when the pawl pivots in response to acceleration or deceleration, whereby the sliding member does not slide in association with movement of the linking rod during acceleration or deceleration of the transportation device.

2. A seat belt apparatus as claimed in claim 1 wherein said preventing means further comprises a latch member engagable with the actuator, and the slidable member and has a notch for receiving the latch member.

3. A seat belt apparatus as claimed in claim 1 wherein said releasing means further comprises a wire member connected to an inside handle for opening the door, and said buckle means comprises a releasing button member having an engaging hole for receiving said wire member of the releasing means.

4. A seat belt apparatus as claimed in claim 3 wherein said engaging means comprises a tongue member connected to one end of the seat belt, and said buckle means comprises an elastic member engagable with the tongue member of the engaging means.

* * * * *